United States Patent
Mori (10) Patent No.: US 9,880,452 B2
(45) Date of Patent: Jan. 30, 2018

(54) IMAGE PROJECTION APPARATUS AND ILLUMINATION OPTICAL SYSTEM

(71) Applicant: SONY CORPORATION, Tokyo (JP)

(72) Inventor: Ichiro Mori, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/277,252

(22) Filed: Sep. 27, 2016

(65) Prior Publication Data

US 2017/0017142 A1    Jan. 19, 2017

Related U.S. Application Data

(63) Continuation of application No. 14/158,169, filed on Jan. 17, 2014, now Pat. No. 9,470,884.

(30) Foreign Application Priority Data

Jan. 30, 2013    (JP) ................................. 2013-015894

(51) Int. Cl.
| | |
|---|---|
| G03B 21/14 | (2006.01) |
| G02B 21/36 | (2006.01) |
| H04N 9/31 | (2006.01) |
| G03B 21/20 | (2006.01) |

(52) U.S. Cl.
CPC ......... *G03B 21/145* (2013.01); *G02B 21/364* (2013.01); *G03B 21/142* (2013.01); *G03B 21/2033* (2013.01); *H04N 9/3141* (2013.01)

(58) Field of Classification Search
CPC ... G03B 21/142; G03B 21/145; H04N 9/3141
See application file for complete search history.

(56) References Cited

U.S. PATENT DOCUMENTS

| | | | |
|---|---|---|---|
| 5,676,442 A | 10/1997 | Fujimori | |
| 6,536,904 B2 * | 3/2003 | Kunzman | H04N 9/3114 348/743 |
| 7,004,589 B2 | 2/2006 | Shimizu | |
| 7,014,324 B2 | 3/2006 | Jang | |
| 8,537,288 B2 | 9/2013 | Hayashi et al. | |
| 2002/0089612 A1 | 7/2002 | Takehiro et al. | |
| 2005/0213059 A1 | 9/2005 | Liu et al. | |
| 2012/0120373 A1 | 5/2012 | Koyama | |
| 2012/0242960 A1 * | 9/2012 | Oiwa | G02B 27/48 353/31 |

FOREIGN PATENT DOCUMENTS

JP    2011-002611 A    1/2011

* cited by examiner

*Primary Examiner* — William C Dowling
(74) *Attorney, Agent, or Firm* — Chip Law Group (57) ABSTRACT

An image projection apparatus includes: an illumination optical system; a projection optical system assembled integrally with the illumination optical system; and a frame fixed to only one system, that has a larger weight, of the illumination optical system and the projection optical system.

13 Claims, 3 Drawing Sheets

IMAGE PROJECTION APPARATUS AND ILLUMINATION OPTICAL SYSTEM

CROSS REFERENCE TO RELATED APPLICATIONS

The present application is a continuation application of U.S. patent application Ser. No. 14/158,169, filed Jan. 17, 2014, which claims the priority from prior Japanese Priority Patent Application JP 2013-15894 filed in the Japan Patent Office on Jan. 30, 2013, the entire content of which is hereby incorporated by reference.

BACKGROUND

The present disclosure relates to an illumination optical system and an image projection apparatus including the illumination optical system and a projection optical system.

A projector (image projection apparatus) has been known in the past, which includes an illumination optical system (illuminating unit) with a light source configured of a halogen lamp, a metal halide lamp, etc., and a projection optical system (projection unit) including an optical modulator, a projection lens, etc. (see Japanese Unexamined Patent Application Publication No. 2011-2611).

In recent years, a small (palm-sized) and lightweight portable projector known as a microprojector is beginning to be widely used in such a projector field. In such a microprojector, a light emitting diode (LED) is mainly used as a light source of an illuminating unit. Furthermore, recently, a laser has been noticed in light of expansion of a color reproduction range and reduction in power consumption.

SUMMARY

Such a microprojector including an LED or a laser as a light source is extremely small in size and weight compared with a projector including a lamp as a light source. On the other hand, in a short-focus-type microprojector, a projection optical system is often configured of a combination of a lens and a concave or convex mirror, which particularly makes it difficult to adjust size and weight of the projection optical system to be similar to size and weight of an illumination optical system. It is to be noted that the short focus type generally refers to a type where the projection optical system has a throw ratio of, for example, 0.75 or less. In particular, a microprojector having the throw ratio of, for example, 0.38 or less may be referred to as of an ultra-short focus type. Herein, the throw ratio is a value obtained by dividing a distance from an emitting section of the projection optical system to a screen surface by a width of a projection screen. A smaller throw ratio indicates that a relatively large screen is projectable at a shorter distance. Since such difficulty exists, in the case where each of the illumination optical system and the projection optical system is fixed to a frame (or housing) for containing such systems, the frame may be desirable to be structurally reinforced as by sufficiently increasing the thickness of the frame. As a result, the overall configuration of the microprojector is difficult to be reduced in size and be decreased in weight. In addition, light axis misalignment may occur between the illumination optical system and the projection optical system due to expansion and construction of the frame caused by temperature variation, deflection of the frame caused by weight of the illumination optical system and the projection optical system, or deformation thereof caused by shock, thereby leading to degradation in display performance.

It is desirable to provide an image projection apparatus capable of exhibiting excellent display performance despite a more-compact configuration thereof, and an illumination optical system to be used in the image projection apparatus.

According to an embodiment of the present disclosure, there is provided an image projection apparatus, including: an illumination optical system; a projection optical system assembled integrally with the illumination optical system; and a frame fixed to only one system, that has a larger weight, of the illumination optical system and the projection optical system.

According to an embodiment of the present disclosure, there is provided an illumination optical system configured to be mounted on an image projection apparatus including a projection optical system and a frame, the illumination optical system being assembled integrally with the projection optical system. Further, only one system, that has a larger weight, of the illumination optical system and the projection optical system is fixed to the frame.

In the illumination optical system and the image projection apparatus according to the above-described respective embodiments of the present disclosure, the illumination optical system and the projection optical system are assembled integrally; hence, the image projection apparatus has a compact configuration compared with a case where the illumination optical system and the projection optical system are individually fixed to the frame. In addition, only one system, that has a larger weight, of the illumination optical system and the projection optical system is fixed to the frame; hence, light axis misalignment due to variation in or distortion (deflection) of a dimension of the frame is less likely to occur between the illumination optical system and the projection optical system.

According to the illumination optical system and the image projection apparatus of the above-described respective embodiments of the present disclosure, light axis misalignment due to variation in or distortion (deflection) of the dimension of the frame is prevented despite a more-compact configuration. Therefore, excellent display performance is exhibited.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some existing microprojectors adopt a module structure, which includes an illumination optical system and a projection optical system assembled integrally, from a viewpoint of housing within a portable apparatus. Such a module structure includes an illumination optical system that uses a light emitting diode (LED), a laser, or the like as a light source for size reduction, and includes a normal-focus-type projection optical system having a relatively-small dimension and a relatively-large throw ratio, for example, larger than 0.75. In a possible desktop projector, the illumination optical system, which uses the LED, the laser, or the like as the light source for size reduction, is combined with a large, short-focus-type projection optical system having a relatively-small throw ratio. In the case of such a desktop projector, when the illumination optical system is provided as a common illumination optical system module having a reduced size, and such an illumination optical system module is combined with a small normal-focus-type projection optical system, it is possible to achieve a projector that is allowed to be housed within a portable apparatus. Furthermore, when the common illumination optical system module having a reduced size is combined with a large short-focus-type projection optical system, it is possible to advantageously configure a short-focus-type desktop projector.

Moreover, in the existing projectors, the illumination optical system and the projection optical system are individually assembled on the same block (frame). However, the illumination optical system and the projection optical system may be preferably assembled integrally in light of preventing light axis misalignment between the illumination optical system and the projection optical system. Furthermore, when the illumination optical system and the projection optical system are each fixed onto the frame after being assembled into one unit, the frame may be deformed at the time of the fixation of the illumination optical system and the projection optical system onto the frame depending on flatness, dimension accuracy, strength, etc. of the frame, which disadvantageously leads to light axis misalignment. Hence, only one of the illumination optical system and the projection optical system may be desirably fixed to the frame.

However, in the case where the projection optical system is fixed to the common illumination optical system as described above, a weight ratio between the two systems may be an issue. For example, while weight of a small projection optical system may be one third or less of weight of an illumination optical system, weight of a large projection optical system may be three times or more as large as the weight of the illumination optical system. Here, if a system having a smaller weight is fixed to the frame, the system having the smaller weight is easily deformed due to the weight of the other system having a larger weight. In addition, when the frame receives a shock, influence of the shock is larger. Consequently, only the system having the larger weight may be preferably fixed to the frame.

Hereinafter, an embodiment of the present disclosure is described in detail with reference to accompanying drawings.

[General Configuration of Projector]

Figure 1:
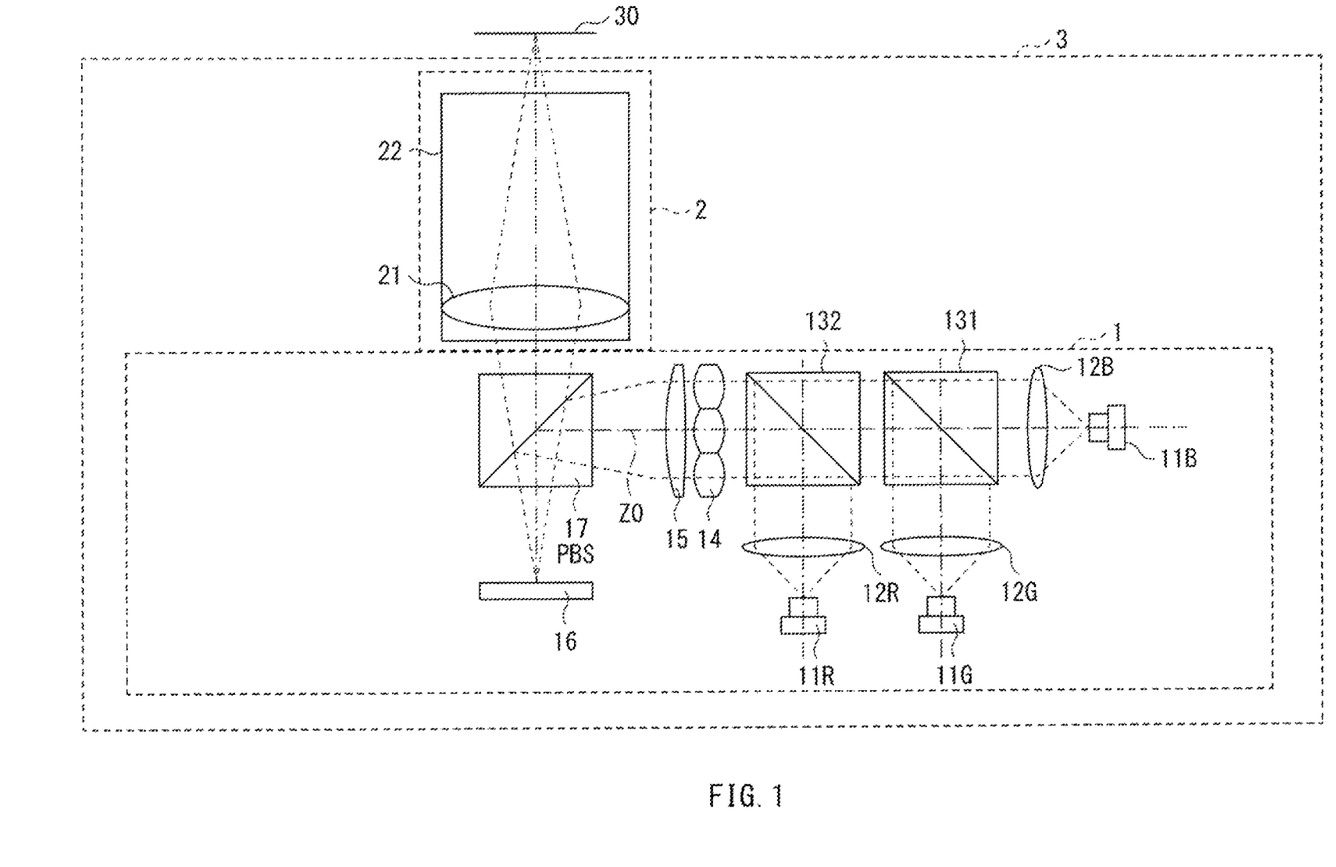
FIG. 1 is a schematic diagram illustrating an exemplary overall configuration of a projector according to an embodiment of the present disclosure.

FIG. 1 illustrates an overall configuration of a projector according to an embodiment of the present disclosure. This projector (image projection apparatus) projects an image (image light) to a screen 30 (surface for projection), and includes an illuminating unit 1, a projection optical system 2 that is configured to perform image display using illuminating light from the illuminating unit 1, and a frame 3 as an outer package containing the illumination unit 1 and the projection optical system 2. The throw ratio of the projection optical system 2 may be, for example, 0.75 or smaller. The image projection apparatus having such a throw ratio is referred to as of a short focus type. If the throw ratio of the projection optical system 2 is particularly small and may be, for example, 0.38 or smaller, such an image projection apparatus may be referred to as of an ultra-short focus type. The illuminating unit 1 and the projection optical system 2 are assembled integrally, and, for example, only the projection optical system 2 may be fixed to the frame 3. The frame 3 may be part of an outer package.

(Illuminating Unit 1)

The illuminating unit 1 includes, within a housing 10, a red laser 11R, a green laser 11G, a blue laser 11B, coupling lenses 12R, 12G, and 12B, dichroic prisms 131 and 132, a fly-eye lens 14, and a condenser lens 15. In the drawing, Z0 indicates a light axis.

The red laser 11R, the green laser 11G, and the blue laser 11B are three types of laser light sources that emit red laser light, green laser light, and blue laser light, respectively. Such laser light sources configure a light source section. For example, the red laser 11R, the green laser 11G, and the blue laser 11B may each emit pulse light. Specifically, for example, each laser may intermittently emit laser light at a predetermined light emission frequency (in a predetermined light emission cycle). For example, the red laser 11R, the green laser 11G, and the blue laser 11B may each be configured of a semiconductor laser, a solid-state laser, or the like. In the case where each laser is configured of a semiconductor laser, for example, the red laser light may have a wavelength $\lambda r$ of about 600 nm to 700 nm both inclusive, the green laser light may have a wavelength $\lambda g$ of about 500 nm to 600 nm both inclusive, and the blue laser light may have a wavelength $\lambda b$ of about 400 nm to 500 nm both inclusive.

The coupling lens 12G is a lens (coupling lens) that collimates the green laser light emitted from the green laser 11G, and allows the collimated light (i.e., converts the green laser light into parallel light, and allows the parallel light) to be coupled with the dichroic prism 131. Similarly, the coupling lens 12B is a lens (coupling lens) that collimates the blue laser light emitted from the blue laser 11B, and allows the collimated light to be coupled with the dichroic prism 131. The coupling lens 12R is a lens (coupling lens) that collimates the red laser light emitted from the red laser 11R, and allows the collimated light to be coupled with the dichroic prism 132. It is to be noted that although each of the coupling lenses 12R, 12G, and 12B collimates the entering laser light (converts the entering laser light into parallel light) in this case, this is not limitative. The laser light may not be collimated (converted into parallel light) by the coupling lenses 12R, 12G, and 12B. However, the laser light may be desirably collimated as described above since a unit configuration is allowed to be reduced in size thereby.

The dichroic prism 131 is a prism that selectively transmits the blue laser light entering through the coupling lens 12B, while selectively reflecting the green laser light entering through the coupling lens 12G. The dichroic prism 132 is a prism that selectively transmits the blue laser light and the green laser light emitted from the dichroic prism 131, while selectively reflecting the red laser light entering through the coupling lens 12R. Consequently, color composition (optical path composition) is performed on the red laser light, the green laser light, and the blue laser light.

The fly-eye lens 14 is an optical component (integrator) including a plurality of lenses (unit cells) that are two-dimensionally arranged on a substrate, and is configured to spatially divide an incident beam into beams corresponding to such arranged lenses, and emit the divided beams. The fly-eye lens 14 is here disposed on an optical path between the dichroic prism 132 and the condenser lens 17. The fly-eye lens 14 emits the divided beams in a superimposed manner. This achieves homogenization of light emitted from the fly-eye lens 14 (homogenization of light amount distribution in a plane). In the fly-eye lens 14, in order to efficiently utilize also obliquely-incident light as illuminating light, the unit cells (unit lenses each having a predetermined curvature) may be preferably formed not only on a light incident side but also on a light emitting side of the fly-eye lens 14.

The condenser lens 15 condenses light emitted from the fly-eye lens 14, and emits the condensed light as illuminating light.

The illuminating unit 1 further includes a reflective liquid crystal panel 16 as an optical modulator and a polarization beam splitter (PBS) 17.

The PBS 17 is an optical component that selectively transmits a particular type of polarized light (for example, p-polarized light), while selectively reflecting another type of polarized light (for example, s-polarized light). Consequently, the illuminating light (for example, s-polarized light) from the illuminating unit 1 is selectively reflected and enters the reflective liquid crystal panel 16, and image light (for example, p-polarized light) emitted from the reflective liquid crystal panel 16 is selectively transmitted and enters a projection lens 21 described later.

It is to be noted that an undepicted field lens may be disposed on an optical path between the PBS 17 and the reflective liquid crystal panel 16. The field lens allows the illuminating light to telecentrically enter the reflective liquid crystal panel 16, and thereby the illuminating unit 1 is allowed to be compactified.

The reflective liquid crystal panel 16 is an optical modulator that reflects the illuminating light from the illuminating unit 1 while modulating the illuminating light based on an image signal supplied from an undepicted display control section, and thus emits image light. In this operation, the reflective liquid crystal panel 16 reflects the illuminating light such that a type of polarized light at light incidence is different from a type of polarized light at light emission. For example, such a reflective liquid crystal panel 16 may be configured of a liquid crystal device such as liquid crystal on silicon (LCOS).

(Projection Optical System 2)

For example, the projection optical system 2 may include a lens barrel 22 containing one or more projection lenses 21. The projection lens 21 is a lens that (expansively) projects the illuminating light (image light) modulated by the reflective liquid crystal panel 16 onto the screen 30.

In the case of a short-focus-type projection optical system 2, for example, a concave or convex mirror may be disposed, which reflects light emitted from the one or more projection lenses 21, and projects the light onto the screen 30. This allows a large image plane to be projected onto the screen 30 even when a distance from the projection optical system 2 to the screen 30 is short.

[Assembling Example of Illuminating Unit 1 and Projection Optical System 2]

Figure 2A:
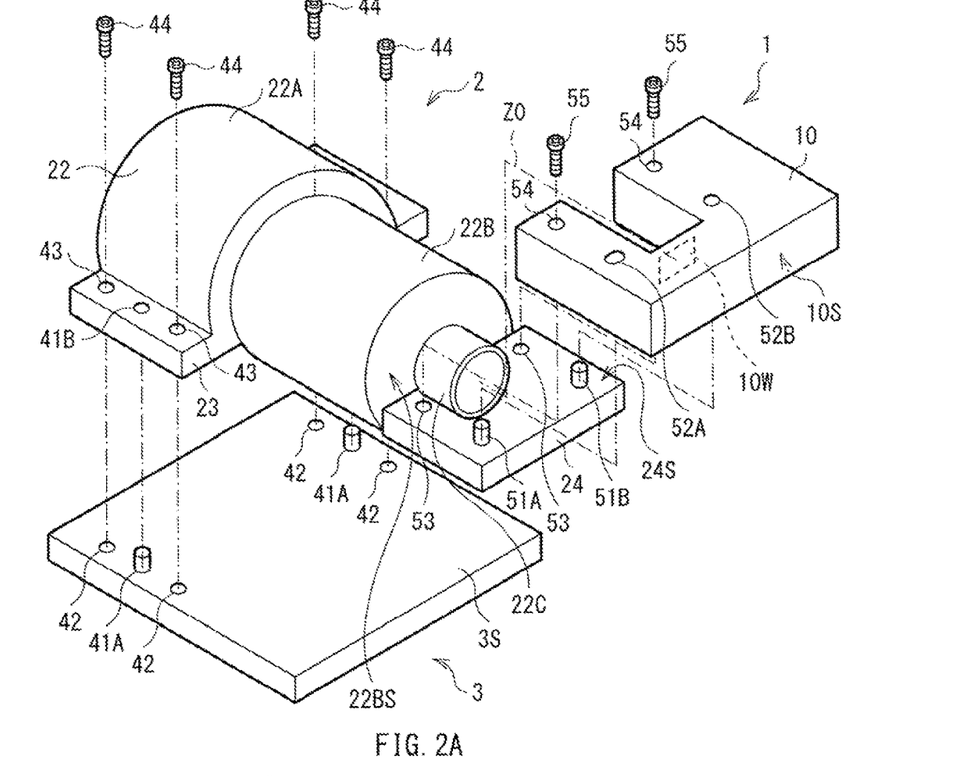
FIG. 2A is an exploded perspective diagram illustrating a relevant part of the projector illustrated in FIG. 1 in an exploded manner.
Figure 2B:
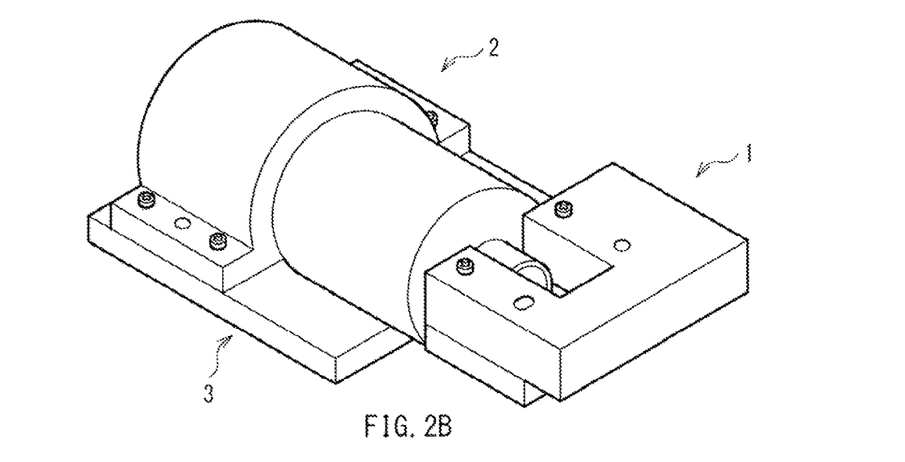
FIG. 2B is a perspective diagram illustrating the relevant part of the projector illustrated in FIG. 1.

A detailed positional layout of a relevant part of the projector of this embodiment is now described with reference to FIGS. 2A and 2B. FIG. 2A is an exploded perspective diagram of the relevant part of the projector of this embodiment while the relevant part is exploded into components of the illuminating unit 1, the projection optical system 2, and the frame 3. FIG. 2B is a perspective diagram illustrating an assembled state of the components. In the projector of this embodiment, for example, the illuminating unit 1 and the projection optical system 2 may be fixed to each other while their respective surfaces extending along a light axis Z0 are opposed to each other. In this projector, the projection optical system 2 has a weight larger than that of the illuminating unit 1. The weight of the projection optical system 2 is preferably three times or more as large as the weight of the illuminating unit 1. Hence, the illuminating unit 1 is fixed to the projection optical system 2, and only the projection optical system 2 is fixed to the frame 3. The illuminating unit 1 and the frame 3 are provided to be away from each other without direct contact. On the other hand, the illuminating unit 1 and the projection optical system 2 are fixed to each other in a direct contact manner. The housing 10 of the illuminating unit 1 is attached to the projection optical system 2.

For example, the lens barrel 22 may have cylindrical portions 22A to 22C disposed in order along the light axis Z0. For example, the cylindrical portions 22A to 22C may hold one or a plurality of lenses. The cylindrical portions 22A to 22C may also hold a concave or convex mirror that reflects light emitted from the one or the plurality of lenses. The cylindrical portions 22A to 22C may further hold a plane mirror that reflects light emitted from the concave or convex mirror. For example, two flanges 23 may be provided at different places on the bottom (a portion to be contacted with the frame 3) of the cylindrical portion 22A. In FIGS. 2A and 2B, one of the flanges 23 is located behind the cylindrical portions 22A and 22B, and is therefore not viewable. Each flange 23 has a fitting hole 41B and two screw-clamping holes 43. For example, a plate-like connection section 24 extending along the light axis Z0 may be provided alongside of the cylindrical portion 22B on an end face 22BS of the cylindrical portion 22B on a side opposite to the cylindrical portion 22A. The connection section 24 has bosses 51A and 51B and two threaded holes 53 on its top face 24S that extends along the light axis Z0. The top face 24S is a surface that is to abut on a bottom face 10S, which also extends along the light axis Z0, of the housing 10. Here, "along the light axis Z0" means that a relative angle to the light axis Z0 is 0° to 45° both inclusive. It is to be noted that each of the top face 24S and the bottom face 10S may be desirably parallel to the light axis Z0. Such a parallel arrangement facilitates formation of the top face 24S and the bottom face 10S, and facilitates fixing operation of the lens barrel 22 to the housing 10. In such a case, each of the top face 24S and the bottom face 10S does not limitedly exist on the light axis Z0. Although the lens barrel 22 has the cylindrical portions 22A to 22C in the above description, the configuration of the lens barrel 22 is not limited thereto. The lens barrel 22 may have another configuration as long as the lens barrel 22 holds one or a plurality of lenses. More preferably, the lens barrel 22 may hold a concave, convex, or plane mirror in addition to the one or the plurality of lenses.

The housing 10 has an opening 10W as a passage of light that is emitted from the PBS 17 to the outside. The illuminating unit 1 is fixed to the lens barrel 22 such that the opening 10W of the housing 10 is opposed to an end face of the cylindrical portion 22C of the lens barrel 22, and the light axis Z0 is aligned. The housing 10 has fitting holes 52A and 52B and two screw-clamping holes 54. The fitting holes 52A and 52B are fitted with the bosses 51A and 51B provided on the connection section 24. Consequently, relative positions between the housing 10 and the lens barrel 22 are determined. The respective two screw-clamping holes 54 run through the housing 10, and are provided at positions corresponding to the two threaded holes 53 provided in the connection section 24 so as to communicate with the threaded holes 53. Screws 55 are inserted into the threaded holes 53 and the screw-clamping holes 54 communicating with each other, so that the lens barrel 22 (projection optical system 2) is fastened to the illuminating unit 1. It is to be noted that the relative positions between the illuminating unit 1 and the projection optical system 2 may be adjusted along the light axis Z0. For example, this may allow adjustment of relative positions between the reflective liquid crystal panel 16 of the illuminating unit 1 and the projection lens 21 of the projection optical system 2. Such adjustment of the relative positions may be performed by a helicoid adjustment mechanism that is configured to move the cylindrical portion 22B or 22C of the lens barrel 22 back and forth along the light axis by means of a helical groove in the lens barrel. Alternatively, such adjustment may be performed by a slide mechanism that is configured to slide the housing 10 with respect to the lens barrel 22. Alternatively, gutter may be provided in an attaching section of the housing 10 so that the relative position of the housing 10 to the lens barrel 22 is adjustable by a jig before fixation. It is to be noted that the relative position may be adjusted not only by the method described above but also by another method. For example, the housing 10 may be preferably configured of a material having excellent heat conductivity such as metal. Furthermore, the housing 10 may more desirably have a structure having excellent radiation performance, for example, by providing a radiation fin so that heat is not easily conducted from the light source to the lens barrel 22.

For example, the frame 3 may be formed of ABS resin. The frame 3 has two bosses 41A and four threaded holes 42 on its top face 3S. Each boss 41A is fitted in each fitting hole 41B of the flange 23. Consequently, relative positions between the frame 3 and the lens barrel 22 are determined. Each threaded hole 42 communicates with each screw-clamping hole 43 of the flange 23, and the lens barrel 22 (projection optical system 2) is fastened to the frame 3 by screws 44 inserted into the threaded holes 42 and the screw-clamping holes 43.

[Display Operation of Projector]

In this projector, as illustrated in FIG. 1, first, the illuminating unit 1 operates as follows: the laser light of the respective colors (the red laser light, the green laser light, and the blue laser light) emitted from the red laser 11R, the green laser 11G, and the blue laser 11B are collimated by the coupling lenses 12R, 12G, and 12B, respectively, into parallel light. Subsequently, such laser light of the respective color collimated into the parallel light is subjected to color composition (optical path composition) by the dichroic prisms 131 and 132. The laser light of the respective colors subjected to the optical path composition passes through the fly-eye lens 14 and the condenser lens 15 in this order so as to be formed into illuminating light, and then enters the PBS 17. In this operation, the fly-eye lens 14 homogenizes the light entering the PBS 17 (homogenizes light amount distribution in a plane).

The illuminating light entering the PBS 17 is selectively reflected by the PBS 17, and enters the reflective liquid crystal panel 16. The reflective liquid crystal panel 16 reflects the illuminating light while modulating the illuminating light based on an image signal, and thus emits the modulated light as image light. In this operation, since a type of polarized light at light incidence is different from a type of polarized light at light emission, the image light emitted from the reflective liquid crystal panel 16 is selectively transmitted by the PBS 17, and enters the projection optical system 2. The image light entering the projection optical system 2 is (expansively) projected onto the screen 30 by the projection lens 21, etc.

At this time, for example, each of the red laser 11R, the green laser 11G, and the blue laser 11B may perform intermittent light emission operation at a predetermined light emission frequency. As a result, the laser light of the respective colors (red laser light, green laser light, and blue laser light) is sequentially emitted in a time-divisional manner. In the reflective liquid crystal panel 16, the laser light of the respective colors is sequentially modulated in a time-divisional manner based on image signals of the respective color components (a red color component, a green color component, and a blue color component) corresponding thereto. In this way, this projector performs color image display based on the image signals.

[Functions and Effects of Projector]

In this way, in this embodiment, the projection optical system 2, which has a relatively-large weight between the illuminating unit 1 and the projection optical system 2 fixed to each other, is fixed to the frame 3. On the other hand, the illuminating unit 1 having a relatively-small weight is fixed to the projection optical system 2 instead of being fixed to the frame 3. As a result, the projector of this embodiment has a compact configuration compared with a case where the illuminating unit 1 and the projection optical system 2 are individually fixed to the frame 3. In addition, such a configuration suppresses occurrence of positional misalignment between the light axis of the illuminating unit 1 and the light axis of the projection optical system 2 due to variation in or distortion (deflection) of a dimension of the frame 3 associated with heat or weight. In the case where the weight of the illuminating unit 1 is one third or less of the weight of the projection optical system 2, the projection optical system 2 fixed to the frame 3 is less likely to receive an excessive load even upon receiving shock by falling, etc., and the position misalignment between the light axis of the illuminating unit 1 and the light axis of the projection optical system 2 is also less likely to occur. Consequently, this projector exhibits excellent display performance. It is to be noted that the illuminating unit 1 and the frame 3 may be connected to each other by a component having no fixation function of the mutual positional relationship, such as a flexible wiring board or a flexible radiation component.

In this embodiment, in particular, the bottom face 10S of the illuminating unit 1 and the top face 24S of the projection optical system 2 each extend along the light axis Z0, and are fixed to each other in an abutting manner. Consequently, area of each of the bottom face 10S and the top face 24S fixed to each other in an abutting manner is sufficiently secured without being limited by a bore of the lens barrel 22 (diameter of a projection lens). Consequently, the illuminating unit 1 and the projection optical system 2 are structurally stably held. As a result, the projector exhibits more excellent display performance.

Furthermore, in the projector of this embodiment, the illuminating unit 1 is not contacted with the frame 3, and is provided to be away from the frame 3. As a result, a space that serves as an air flow path for heat radiation to the surrounding of the illuminating unit 1 is easily secured, and thereby it is possible to sufficiently cool the illuminating unit 1 during operation. Consequently, even if this projector as a whole is reduced in size, heating of the frame 3 is sufficiently suppressed, and thus reliability in safety is also improved.

Furthermore, the illuminating unit 1 of the projector of this embodiment is formed as one unit in such a manner that the laser light sources, the optical multiplexers (dichroic prisms 131 and 132), the reflective liquid crystal panel 16, and the PBS 17 are contained in one housing 10. This unit configuration allows the overall configuration of the projector to be compactified, and is suitable for improvement in efficiency of assembling operation and improvement in accuracy.

Modification 1

Figure 3A:
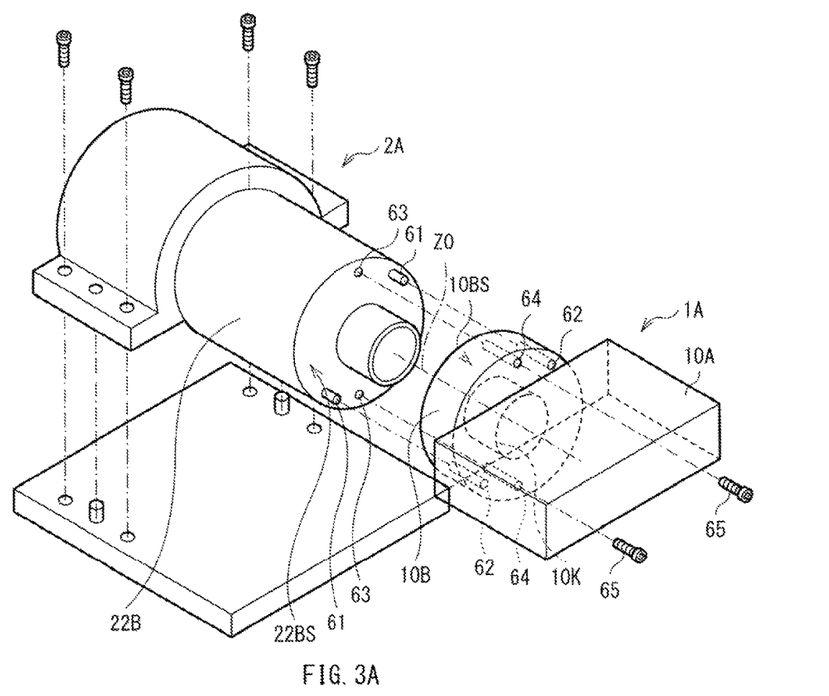
FIG. 3A is an exploded perspective diagram illustrating a modification of the relevant part of the projector illustrated in FIG. 1 in an exploded manner (Modification 1).
Figure 3B:
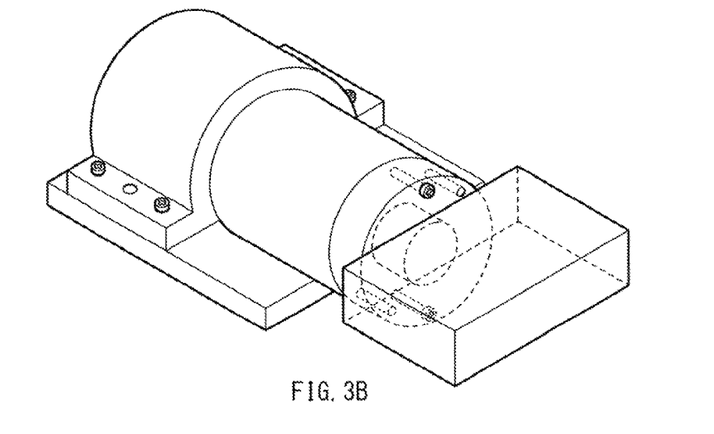
FIG. 3B is a perspective diagram illustrating the modification of the relevant part of the projector illustrated in FIG. 1 (Modification 1).

FIGS. 3A and 3B each illustrate a relevant part of a projector as a modification (Modification 1) of this embodiment. FIG. 3A is an exploded perspective diagram illustrating the relevant part of the projector as Modification 1 while the relevant part is exploded into components of an illuminating unit 1A, a projection optical system 2A, and the frame 3. FIG. 3B is a perspective diagram illustrating an assembled state of the components.

In the projector of the above-described embodiment, the illuminating unit 1 and the projection optical system 2 are fixed to each other while the bottom face 10S and the top face 24S, which each extend along the light axis Z0, are opposed to each other. On the other hand, the projector of Modification 1 includes the illuminating unit 1A and the projection optical system 2A. The illuminating unit 1A and the projection optical system 2A are fixed to each other while respective surfaces thereof, i.e., an end face 10BS and an end face 22BS (described later) each extending in a direction intersecting with the light axis Z0, are opposed to each other. Here, "direction intersecting with the light axis Z0" means that a relative angle to the light axis Z0 is larger than 45° and equal to or smaller than 90°. It is to be noted that both the end face 10BS and the end face 22BS may be desirably orthogonal to the light axis Z0. Such an orthogonal arrangement facilitates formation of the end face 10BS and the end face 22BS, and facilitates fixing operation of the illuminating unit 1A (a housing 10A and a connection component 10B) to the lens barrel 22.

In the illuminating unit 1A, an annular connection component 10B having a cylindrical opening 10K is fixed to the housing 10A. The housing 10A may have a configuration substantially similar to the configuration of the housing 10 except for having the connection component 10B, for example. The opening 10K is provided at a position corresponding to an emitting position of image light that is emitted from the reflective liquid crystal panel 16 and is then selectively transmitted by the PBS 17. As described above, the end face 10BS of the connection component 10B on a side opposite to the housing 10A is fixed to the end face 22BS in an abutting manner. Specifically, for example, the end face 22BS may have two bosses 61 and two screw-clamping holes 63, while the end face 10BS has two fitting holes 62 and two threaded holes 64 that run through the connection component 10B. Each boss 61 fits in each fitting hole 62, so that relative positions between the illuminating unit 1A and the projection optical system 2A are determined. The two screw-clamping holes 63 communicate with the two threaded holes 64, respectively, and the projection optical system 2A is fastened to the illuminating unit 1A by screws 65 inserted into the screw-clamping holes 63 and the threaded holes 64.

The projector including the illuminating unit 1A and the projection optical system 2A which are configured in the above way, also exhibits functions and effects similar to those of the projector of the above-described embodiment. In particular, such a configuration is suitable for reduction in dimension in a direction along the light axis Z0 compared with the projector of the above-described embodiment.

Although the technology of the present disclosure has been described with the example embodiment and the modification thereof hereinbefore, the technology of the present disclosure is not limited to the above-described embodiment and the like, and various modifications or alterations may be made. For example, although the above-described embodiment has been described with an exemplary case where the top face 24S of the connection section 24 and the bottom face 10S of the housing 10 abut on each other, the technology of the present disclosure is not limited thereto. For example, the top face 24S of the connection section 24 and the bottom face 10S of the housing 10 may be opposed to each other with another component in between so that the connection section 24 and the housing 10 are indirectly fixed to each other.

Moreover, although the above-described embodiment and Modification 1 have been described with an exemplary case where the major polarized-light component of the illuminating light is an s-polarized light component, this is not limitative. Conversely, in the case where the major polarized-light component of the illuminating light is a p-polarized light component, the technology of the present disclosure is also applicable.

Moreover, although the above-described embodiment and Modification 1 have been described with an exemplary case where the projection optical system has a weight larger than that of the illuminating unit, the technology of the present disclosure is not limited thereto. Specifically, the illuminating unit may have a weight larger than that of the projection optical system. In such a case, the illuminating unit is fixed to the frame.

Furthermore, although the above-described embodiment and Modification 1 have been described with an exemplary case where the plurality of (red, green, and blue) light sources are each a laser light source, this is not limitative, and another type of light source (for example, LED, etc.) may be used. Alternatively, a laser light source and another type of light source (for example, LED, etc.) may be used in combination.

In addition, although the above-described embodiment and Modification 1 have been described with an exemplary case where the optical modulator is a reflective liquid crystal device, this is not limitative. Specifically, for example, the optical modulator may be a transmissive liquid crystal device, or may be an optical modulator other than the liquid crystal device (for example, a digital micro-mirror device (DMD)).

Moreover, the above-described embodiment and Modification 1 have been described with an exemplary case of using three types of light sources emitting light having different wavelengths. However, for example, one type of light source, two types of light sources, or four or more types of light sources may be used instead of the three types of light sources.

Furthermore, although the above-described embodiment and Modification 1 have been described while the components (optical systems) of the illuminating unit and the projector are specifically mentioned, it is not necessary to provide all of the mentioned components, and other components may be additionally provided. Specifically, for example, dichroic mirrors may be provided in place of the dichroic prisms 131 and 132.

It is possible to achieve at least the following configurations from the above-described example embodiment and the modifications of the disclosure.

(1) An image projection apparatus, including:
an illumination optical system;
a projection optical system assembled integrally with the illumination optical system; and
a frame fixed to only one system, that has a larger weight, of the illumination optical system and the projection optical system.

(2) The image projection apparatus according to (1), wherein the projection optical system has a weight larger than a weight of the illumination optical system.

(3) The image projection apparatus according to (2), wherein
the illumination optical system includes a light source, and
the light source is configured of one of a light emitting diode and a laser.

(4) The image projection apparatus according to (2) or (3), wherein the projection optical system has a throw ratio of 0.75 or smaller.

(5) The image projection apparatus according to (4), wherein the weight of the projection optical system is three times or more as large as the weight of the illumination optical system.

(6) The image projection apparatus according to any one of (1) to (5), further including a housing containing the illumination optical system, wherein the housing and the projection optical system are assembled integrally.

(7) The image projection apparatus according to (6), wherein the housing is formed of metal.

(8) The image projection apparatus according to any one of (1) to (7), wherein the frame serves as an outer package containing the illumination optical system and the projection optical system.

(9) The image projection apparatus according to (2), wherein the illumination optical system and the frame are provided to be away from each other without being in direct contact with each other.

(10) The image projection apparatus according to (3), wherein the illumination optical system further includes an optical multiplexer and an optical modulator.

(11) The image projection apparatus according to any one of (1) to (10), wherein the illumination optical system and the projection optical system are fixed to each other in direct contact with each other, or are indirectly fixed to each other with another component in between.

(12) The image projection apparatus according to (10) or (11), wherein the illumination optical system and the projection optical system are fixed to each other to allow a surface of the illumination optical system and a surface of the projection optical system to be opposed to each other, the surface of the illumination optical system and the surface of the projection optical system each being parallel to a light axis.

(13) The image projection apparatus according to (10) or (11), wherein the illumination optical system and the projection optical system are fixed to each other to allow a surface of the illumination optical system and a surface of the projection optical system to be opposed to each other, the surface of the illumination optical system and the surface of the projection optical system each being orthogonal to a light axis.

(14) The image projection apparatus according to any one of (1) to (13), wherein respective relative positions of the illumination optical system and the projection optical system are adjustable in a light axis direction.

(15) An illumination optical system configured to be mounted on an image projection apparatus including a projection optical system and a frame, the illumination optical system being assembled integrally with the projection optical system, wherein
only one system, that has a larger weight, of the illumination optical system and the projection optical system is fixed to the frame.

It should be understood by those skilled in the art that various modifications, combinations, sub-combinations and alterations may occur depending on design requirements and other factors insofar as they are within the scope of the appended claims or the equivalents thereof.

What is claimed is:

1. An image projection apparatus, comprising:
    an illumination optical system that comprises:
        a plurality of light sources, wherein at least one light source of the plurality of light sources is a laser light source, and
        a dichroic prism configured to perform a color composition;
    a projection optical system assembled integrally with the illumination optical system; and
    a frame fixed to the projection optical system,
        wherein the illumination optical system lacks direct contact with the frame, and
        wherein the frame serves as an outer package that comprises the illumination optical system and the projection optical system.

2. The image projection apparatus according to claim 1, wherein the illumination optical system further includes an optical multiplexer.

3. The image projection apparatus according to claim 1, further comprising a housing,
    wherein the housing comprises the illumination optical system, and
    wherein the housing and the projection optical system are assembled integrally.

4. The image projection apparatus according to claim 3, wherein the housing comprises a metal.

5. The image projection apparatus according to claim 3, wherein the housing lacks direct contact with the frame.

6. The image projection apparatus according to claim 1, wherein a throw ratio of the projection optical system is equal to or smaller than 0.75.

7. The image projection apparatus according to claim 1, wherein a first weight of the projection optical system is three times or more than a second weight of the illumination optical system.

8. The image projection apparatus according to claim 1, further comprises a component fixed between the illumination optical system and the projection optical system.

9. The image projection apparatus according to claim 1,
    wherein the illumination optical system is fixed with the projection optical system such that a first surface of the illumination optical system is opposed to a second surface of the projection optical system, and
    wherein each of the first surface of the illumination optical system and the second surface of the projection optical system is parallel to a light axis.

10. The image projection apparatus according to claim 1,
    wherein the illumination optical system is fixed with the projection optical system such that a first surface of the illumination optical system is opposed to a second surface of the projection optical system, and wherein each of the first surface of the illumination optical system and the second surface of the projection optical system is orthogonal to a light axis.

11. The image projection apparatus according to claim 1, wherein respective relative positions of the illumination optical system and the projection optical system are adjustable in a light axis direction.

12. The image projection apparatus according to claim 1, wherein the illumination optical system and the frame are connected through the projection optical system.

13. An image projection apparatus, comprising:
an illumination optical system that comprises:
  a plurality of light sources, wherein at least one light source of the plurality of light sources is a laser light source; and
  a dichroic prism configured to perform a color composition;
a projection optical system assembled integrally with the illumination optical system; and
a frame fixed to the projection optical system,
  wherein a first weight of the projection optical system is more than a second weight of the illumination optical system,
  wherein the illumination optical system is fixed to the projection optical system and the illumination optical system is connected to the frame through the projection optical system, and
  wherein the frame serves as an outer package that comprises the illumination optical system and the projection optical system.

* * * * *